United States Patent [19]

Castaneda

[11] Patent Number: 4,786,895
[45] Date of Patent: Nov. 22, 1988

[54] CONTROL PANEL

[75] Inventor: Fernando Castaneda, Contago, Costa Rica

[73] Assignee: Xeltron, S. A., San Jose, Costa Rica

[21] Appl. No.: 762,543

[22] Filed: Aug. 2, 1985

[51] Int. Cl.$^4$ .......................... G09G 3/02; G09G 1/06
[52] U.S. Cl. .................................... 340/709; 340/723; 340/724; 340/747
[58] Field of Search ............... 340/723, 724, 726, 725, 340/721, 747, 709

[56] References Cited

U.S. PATENT DOCUMENTS

| | | | |
|---|---|---|---|
| 4,313,113 | 1/1982 | Thornburg | 340/709 |
| 4,495,490 | 1/1985 | Hopper et al. | 340/723 |
| 4,586,035 | 4/1985 | Baker et al. | 340/723 |
| 4,698,626 | 10/1987 | Sato et al. | 340/709 |

OTHER PUBLICATIONS

IBM Technical Disclosure Bulletin, vol. 27, No. 11, Apr. 1985, p 6788.

Primary Examiner—John W. Caldwell, Sr.
Assistant Examiner—Tyrone Queen
Attorney, Agent, or Firm—Seed and Berry

[57] ABSTRACT

A control panel having a display for displaying selected statements from a plurality of stored statements containing one or more separate elements of alterable information; four selectively operable push-button switches; and a computer for storing the stored messages and controlling the display. The switches include left and right scroll switches and up and down-increment switches. The computer controls a cursor on the display movable left and right between one or more pre-programmed positions in each displayed statement in response to operation of the scroll switches. Each of the pre-programmed positions corresponds to one of the segments of alterable information. The scroll switches cause the computer to scroll left or right for sequentially displaying the next left or right statement. Scrolling to the next stored statement is in response to the scroll switch indicating an attempt to move the cursor left or right beyond the leftmost or rightmost pre-programmed position for the displayed statement. The computer increments up and down the segment of alterable information corresponding to the pre-programmed position to which the cursor has been moved in response to operation of the increment switches.

10 Claims, 1 Drawing Sheet

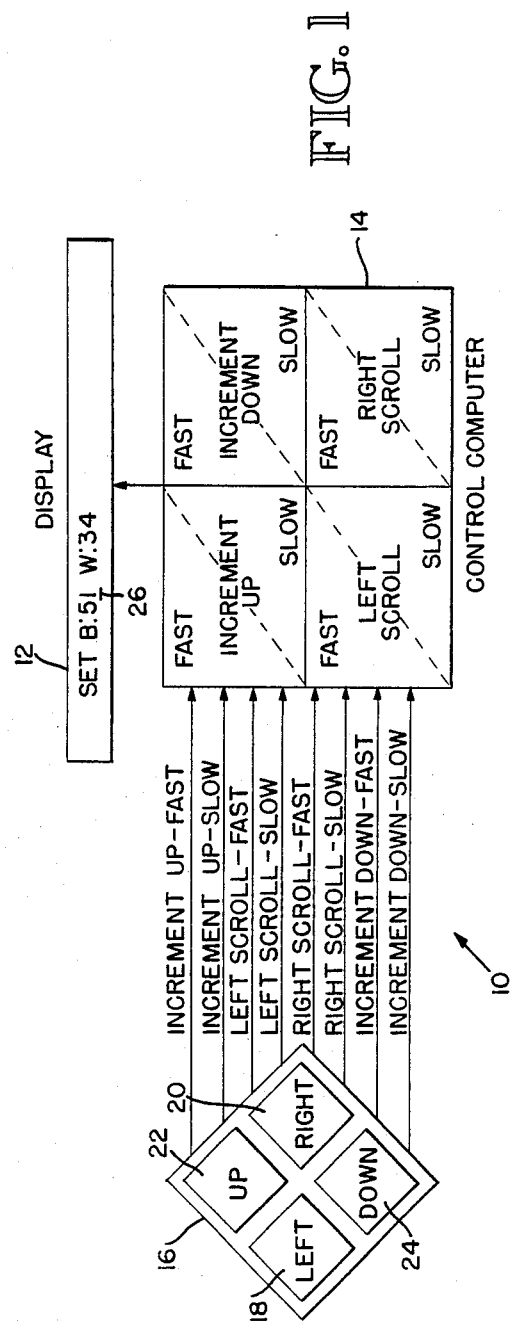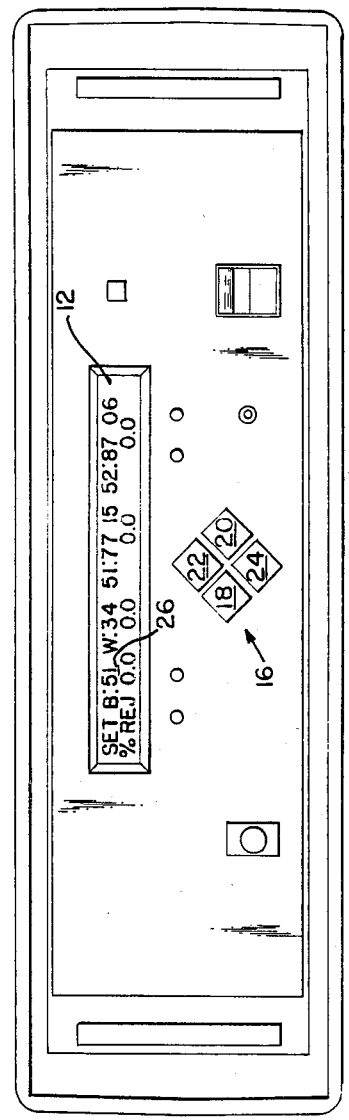
FIG. 1
FIG. 2

CONTROL PANEL

TECHNICAL FIELD

The present invention relates generally to control panels, and more particularly, to control panels of the type in which the user must input parameter values or other data, select a mode of operation or call up a display of performance data for equipment.

BACKGROUND ART

Conventional control panels exist which incorporate displays, and allow the user to input parameter values or other data, select modes of operation, and call up various displays of performance data for the equipment with which the control panel functions. Such control panels are often difficult to use, requiring that many dials and switches be set to operate the control panel. With computer-based control panels, generally a computer display and keyboard are provided requiring the user to operate the control panel by pushing keyboard buttons and viewing the display. In both situations, the task is relatively complicated and more than minimal training is required just to know how to operate the control panel.

When using a computer keyboard, the control keys or codes must be learned which select the particular functions, operations or displays, and when it is required to input data or select one of several modes of operation, the user must then type in the appropriate data or codes.

In addition to requiring training and the memorization or looking up of control key designations and codes, the operation of the control panel is time consumming and it is susceptible to operator error. For large and complicated systems, where many control keys or codes are utilized, the level of difficulty in operating the control panel can become unacceptable.

In those situations where the user of a conventional control panel is performing another task while operating the control panel, such as overseeing a production machine or driving an automobile, the amount of user eye contact required to operate the control panel is undesirable. When the user is inputting parameter values or other data, selecting modes of operation, or calling up a display of performance data, he is distracted from concentrating on the principle task. Keying various control codes and data from a large keyboard is particularly a problem for people unfamiliar with the keyboard and who must first visually search for the appropriate key and then keep looking at the key until it is touched to make sure that the desired key is depressed. In situations where the keyboard is positioned at a distance from the user, the user cannot safely look at the keyboard for sufficient time to read the indicia on the keys and determine which keys to depress, and then move the hand to that key, without being dangerously distracted from his main task.

It will therefore be appreciated that there has been a need for a control panel which is quick and easy to operate without extensive training, and is less susceptible to operate error. For those situations in which the user must be performing another task while operating the control panel, a minimal amount of visual attention should be required while operating the control panel. The present invention fulfills these needs and further provides other related advantages, while avoiding many of the disadvantages of conventional control panels.

DISCLOSURE OF THE INVENTION

The present invention relates in a control system operable by a user. The control system includes a display for displaying selected statements from a plurality of stored statements each containing one or more separate segments us user-alterable information; up-switching means for generating an increment-up signal responsive to selective operation by the user; down-switching means for generating an increment-down signal responsive to selective operation by the user; left-switching means for generating a left-scroll signal responsive to selective operation by the user; right-switching means for generating a right scroll signal responsive to selective operation by the user; and computer means for storing the plurality of stored statements and controlling the display.

The computer means controls a cursor on the display moveable left and right between one or more pre-programmed positions in each displayed statement in response to the left and right scroll signals. Each of the pre-programmed positions corresponds to one of the segments of alterable information. The computer means scrolls left or right for sequentially displaying the next stored statement in response to the left scroll or right-scroll signal indicating user-instructed movement of the cursor to the left or right beyond the leftmost or rightmost pre-programmed position of the displayed statement. The computer means increments up and down the segment of alterable information corresponding to the pre-programmed position to which the cursor has been moved in response to the increment up and down signals.

In the presently preferred embodiment of the invention, the switching means are four selectively operable switches, such as push button switches. The switches are arranged in a diamond-shaped pattern with the up-switch position above the down-switch, and the left-switch position to the left of the right-switch, as viewed by a user. The four switches are arranged about a common central point providing a diamond-shaped switch layout pattern. The computer means increases the scrolling speed and incrementing speed responsive to continuous operation by the user of the up or down switches, or the left or right switches, respectively.

The statements may including a non-alterable identifying indicator corresponding to each of the segments of alterable information. The computer means may also store informational statements for display without a segment of user-alterable information. In such case, each of the informational statements has at least one associated pre-programmed position for the cursor. The user-alterable information may represent input operating parameter values, input data or selectable modes of operation for a machine with which the control system is utilized.

Other features and advantages of the invention will become apparent from the following detailed description, taken in conjunction with the accompanying drawings.

BRIEF DESCRIPTION OF THE DRAWINGS

FIG. 1 is a schematic drawing of a control panel embodying the present invention.

FIG. 2 is a front elevational view of a control panel embodying the present invention.

BEST MODE FOR CARRYING OUT THE INVENTION

As shown in the drawings for purposes of illustration, the present invention is embodied in a control panel, indicated generally by reference numeral 10. The control panel 10 includes a digital display 12, a computer 14 programmed to control the display in response to inputs from a bank of four control switches 16. In the presently preferred embodiment of the invention, the control switches are momentary contact push buttons. The control panel 10 will be described herein as used in a sorting machine, but it is to be understood that the control panel of the present invention may be used in many applications, including, an automobile control panel in which the driver must input data, select modes of operation and call up performance displays such is found in many recently manufactured automobiles.

The control computer 14 is programmed in a conventional manner to store a plurality of separate messages or statements and provide on the display 12 selected ones of the statements. Some statements may be purely informational in nature, such as to display performance data of the sorting machine with which the control panel is used. Other statements may contain one or more separate segments of user-alterable information, such as input operating variables or parameters or other data so that the user may input a desired value in order to control the operation of the sorting machine. This can be to initialize the value or change a prior setting of the value. Usually the statement will include a portion which is not alterable but which identifies the particular parameter or data value being displayed. Similarly, statements may be formatted which allow the user to select or set a particular mode of operation among one or more available alternatives.

The control computer 14 and the display 12 are programmed and arranged such that the particular statement which the user desires to have displayed may be selected by scrolling left or right until the desired statement is reached and it appears on the display. The user scrolls the statements left or right to view the desired statement by using either a left scroll button 18 or a right scroll button 20 comprising two of the four control switches 16. The left and right scroll buttons 18 and 20 are positioned on the control panel 10 with a left and right arrangement, respectively as viewed by the user.

As previously noted, the desired statement is brought to the display 12 by scrolling left or right using the left or right scroll buttons 18 and 20. When the desired statement appears on the display 12, depending upon the particular type of statement, the user may input operating parameters or data or select from alternative modes of operation using an increment-up button 22 or an increment-down button 24 comprising the other two buttons of the control switches 16. The increment-up and increment-down buttons 22 and 24 are positioned on the control panel 10 with an up and down arrangement, respectively, as viewed by the user.

For ease of operation, the buttons comprising the control switches 16 are arranged with the left and right scroll buttons 18 and 20 adjacent to each other, and the increment-up and increment-down buttons 22 and 24 adjacent to each other. The increment-up button 22 is generally higher than and inward of the left and right scroll buttons, and the increment-down button 24 is generally lower than and inward of the left and right scroll buttons. The buttons are spaced about a common center point to form a diamond-shaped layout.

The control computer 14 controls a cursor 26 which is displayed on the display 12 and moved left or right in response to operation of the left and right scroll buttons 18 and 20, respectively. Each of the stored statements has one or more pre-programmed positions between which the cursor 26 may be moved when the statement appears on the display 12. Each of the pre-programmed positions of a displayed statement corresponds to one of the segments of user-alterable information, such as an input operating parameter or a selectable mode of operation. For statements containing only readable information which cannot directly altered, at least one pre-programmed position is provided to permit selection of that statement for viewing and change to the next statement, in the manner described below. As previously noted, the particular statement displayed is selected by operation of the left and right scroll buttons 18 and 20, and the function of the cursor 26 when scrolling between statements will be described in more detail below.

For displayed statements containing alterable information, the cursor 26 is moved left or right between the pre-programmed positions of the statement using the left and right scroll buttons 18 and 20 until the cursor is in the pre-programmed position corresponding to the alterable information the user desires to change. As previously described, the value of the user-alterable information is changed by using the increment-up and increment-down buttons 22 and 24 to incrementally increase or decrease the value.

By way of example, the display 12 of FIG. 1 shows a statement consisting of two operating parameters "B" and "W". The statement includes unalterable displayed letters "B" and "W" to identify the two parameters to the user, and the word "SET" indicating that the statement includes operating parameters that may be set by the user. The statement also includes two pre-programmed positions between which the cursor 26 may move, one next to each of the letters "B" and "W". Each pre-programmed position corresponding to one of the two segments of the user-alterable information, here the two operating parameter values for the parameters "B" and "W". The pre-programmed position closest to the displayed letter corresponds to that parameter, and the value of the parameter being displayed immediately above the cursor. As presently shown, the parameter "B" is set at 51 and the parameter "W" is set at 34.

If the user decides to change one of the operating parameters, the cursor 26 is moved to the pre-programmed position corresponding to the parameter to be changed, in this case under the displayed parameter value, simply by using the left and right scroll buttons 18 and 20. In FIG. 1, the cursor is shown positioned to change the "B" parameter. Since the cursor 26 jumps directly from one pre-programmed position to the next, without stopping at or passing through each possible space or position on the display 12 along the way, the move is accomplished quickly and without the user needing to know any codes or to visually search a large keyboard for the correct key or combination of keys to push.

To change the value of the operating parameter, the user than simply depresses either the increment-up button 22 to incrementally increase the parameter from its present value or the increment-down button 24 to incrementally decrease the parameter from its present value. The parameter may be changed slowly by using single strokes of the increment-up or down buttons, or may be changed more rapidly by continuously depressing the buttons. Similarly, the left and right scroll movement may be accomplished slowly by using single strokes of the left and right scroll buttons, or more rapidly by continuously depressing the buttons. The control computer 14 is programmed in a conventional manner to move the cursor left and right, and to change the displayed value of the parameter indicated by the position of the cursor in response to signals generated by operation of the left and right scroll buttons and the increment-up and down buttons. The control computer is also programmed in a conventional manner to sense a continuous depression of any of the buttons, and in response thereto accomplish a speeded-up scrolling or incrementing.

Once a parameter has been set to the desired value, the cursor 26 may be moved to the next parameter by depressing the scroll left or right buttons 18 or 20. The cursor will move left or right between the pre-programmed positions of the displayed statement in response to the left or right scroll buttons, respectively, without the displayed statement being changed as long as the user does not attempt to move the cursor left or right beyond the leftmost or rightmost pre-programmed position of the displayed statement. When the user decides to display a different statement on the display 12, the left or right scroll buttons 18 or 20 may be depressed until the cursor 26 is instructed to move left or right beyond the leftmost or rightmost pre-programmed position of the statement presently being displayed on the display 12. Thereupon, the control computer 14 causes the next left or right statement in the sequence of stored statements, to appear on the display 12.

The cursor 26 may then be moved around between the pre-programmed positions of the newly displayed statement to change parameter values of that statement without causing a new statement to displayed. As previously noted, certain statements may be informational only, such as to show the status of machine performance data, and a single pre-programmed position will be provided for the statement. Operation of the left or right scroll buttons 18 and 20 will immediately cause a change to the next stored statement. The up and down 22 and 24 buttons will have no effect.

If the user continuously strokes or depressed the same left or right scroll button, the control computer will continue scrolling left or right through the pre-programmed positions of each displayed statement and onto the next statement which will then be displayed. When continuously depressing the scroll button, the cursor will move in clocked fashion, and the movement of the cursor and the changing of displayed statement will cease when the button is released.

With the control panel 10 of the present invention, operation by the user is extremely simple, requiring him to depress only a single left or right scroll button, depending upon whether he wishes the cursor to be moved left or right within the displayed statement for selecting a parameter or to display the next stored statement to the left or right of the displayed statement. THe user then need only depress a single increment-up or down button to increment up or down the value of the parameter selected which appears on the display above the cursor.

As such, the user does not have to remember complicated control signals, does not have to search with his eyes to locate the particular key or keys required to input the control signal or the parameter value being entered, and does not have to carefully key in the control signal or the numerical parameter value. Unlike a complicated keyboard, the location of the particular button of the four buttons the user desires to depress may be determined at a glance, or even by feel because of their diamond-shaped arrangement which corresponds to their functions. This allows the user to concentrate primarily on the other task he may be performing, and to only be visually distracted to the extent necessary to view the display 12. The display may be conveniently positioned to minimize even this distraction.

Unlike with the keyboard, even the untrained user of the present invention does not have to first look at the keyboard to determine which key to depress and that he is keying in the correct code or value, and then confirm it by looking at the display. With the present invention, the user need only look at the display, and if he increments the parameter value too far up or down when operating the increment-up or down buttons 22 or 24, he need only depress the opposite button to bring the parameter value to the desired value.

In addition to its simplicity of operation, the present invention eliminates all but four keys or buttons required to operate the control panel and therefore eliminates most of the electro-mechanical parts which frequently cause failure. With just four buttons, the entire operation of the control panel may be accomplished and large amounts of information, parameters and other data may be selectively displayed, input and modified. Since much of the operation of the control panel of the present invention is a function of the programming of the control computer 14, changes in the operation, display and parameters can easily be made by minor software program changes without affecting the electrical or mechanical components of the control panel. The addition or deletion of even large numbers of parameters is easy to accomplish without requiring any hardware changes. The number of statements, and hence the number of operating parameters and informational displays available for a control panel, is only limited by the memory capacity of the control computer used and even for the largest system, the control panel utilizes the same simple and easy-to-operate four-button arrangement with a single display.

A microcomputer may be used to implement the control panel 10 of the present invention, and the above-described functions of the scrolling left and right and incrementing up and down, both in a fast and slow mode, are well known in the art and need not be described in detail here. Similarly, the construction of the scroll and increment buttons and the display, and their manner of interconnection with the control computer are conventional and do not require a detailed description.

It will be appreciated that, although specific embodiments of the invention have been described herein for purposes of illustration, various modifications may be made without departing from the spirit and scope of the invention. Accordingly, the invention is not limited except by the appended claims.

I claim:

1. A control panel, comprising:
   a digital display for displaying selected statements from a plurality of stored statements each said stored statement containing one or more separate segments of user-alterable input parameters and each said stored statement containing one or more separate segments of non-alterable parameter identifiers wherein said non-alterable parameter identifiers are provided for identifying the significance of said user-alterable input parameters;

four selectively operable switches, including an increment-up switch and an increment-down switch, with said increment-up switch positioned above said increment-down switch, and a left scroll switch and a right scroll switch, with said left scroll switch positioned to the left or said right scroll switch, when viewed by a user of the control panel, said increment up and down switches and said left and right scroll switches being arranged about a common central point to provide a diamond-shaped switch layout; and computer means for storing said plurality of stored statements and controlling said display, said computer means controlling a cursor on said display movable left and right between one or more pre-programmed positions in each displayed statement in response to operation of said left and right scroll switches, respectively, each of said pre-programmed positions corresponding to one of said segments of alterable parameters, said computer means scrolling left or right for sequentially displaying the next stored statement in response to operation of said left and right scroll switches indicating user-instructed movement of said cursor to the left or right beyond the leftmost or rightmost pre-programmed position of the displayed statement, said computer means incrementing up and down the value of said segment of alterable parameter corresponding to the pre-programmed position to which said cursor has been moved in response to operation of said increment up and down switches, respectively.

2. A control system operable by a user, comprising:

a display for displaying selected statements from a plurality of stored statements each said stored statement containing one or more separate segments of user-alterable information and each said stored statement containing one or more separate segments of non-alterable information wherein said non-alterable information is provided to identify the significance of said user-alterable information;

up switching means for generating an increment-up signal responsive to selective operation by the user;

down switching means for generating an increment-down signal responsive to selective operation by the user;

left switching means for generating a left-scroll signal responsive to selective operation by the user;

right switching means for generating a right-scroll signal responsive to selective operation by the user;

computer means for storing said plurality of stored statements and controlling said display, said computer means controlling a cursor on said display movable left and right between one or more pre-programmed positions in each displayed statement in response to said left-scroll and right-scroll signals, each of said pre-programmed positions corresponding to one of said segments of alterable information, said computer means scrolling left or right for sequentially displaying the next stored statement in response to said left-scroll or right-scroll signal indicating user-instructed movement of said cursor to the left or right beyond the leftmost or rightmost pre-programmed position of the displayed statement, said computer means incrementing up and down the value of said segments of alterable information corresponding to the preprogrammed position to which said cursor has been moved in response to said increment up and down signals.

3. The control system of claim 2 wherein said up, down, left and right switching means are four push-button switches arranged in a diamond-shaped pattern with said up-button switch positioned above said down-button switch, and said left-button switch positioned to the left of said right-button switch, as viewed by a user.

4. The control system of claim 2 wherein said computer means increases the scrolling speed or the incrementing speed responsive to continuous operation by the user of said up or down switching means, or said left or right switching means, respectively.

5. The control system of claim 2 wherein said segments of alterable information represent input operating parameter values for a machine with which the control system is utilized.

6. The control system of claim 2 wherein said segments of alterable information represent input data for a machine with which the control system is utilized.

7. The control system of claim 2 wherein said segments of alterable information represent selectable modes of operation for a machine with which the control system is utilized.

8. The control system of claim 2 wherein said computer means stores one or more informational statements for display without a segment of user-alterable information, each of said informational statements having at least one associated pre-programmed position of said cursor.

9. A control system operable by a user, comprising:

a display for displaying selected statements from a plurality of stored statements each said stored statement containing one or more separate segments of user-alterable information and each said stored statement containing one or more separate segments of non-alterable information wherein said non-alterable information is provided for identifying the significance of said user-alterable information;

up-switching means for generating an increment-up signal responsive to selective operation by the user;

down switching means for generating an increment-down signal responsive to selective operation by the user;

first-directional switching means for generating a first-directional scroll signal responsive to selective operation by the user;

second-directional switching means for generating a second-directional scroll signal responsive to selective operation by the user;

computer means for storing said plurality of stored statements and controlling said display, said computer means controlling a cursor on said display movable in first and second opposite directions between one or more generally linearly displayed pre-programmed positions in each displayed statement in response to said first and second directional scroll signals, each of said pre-programmed positions corresponding to one of said segments of alterable information, said computer means scrolling in said first or second direction for sequentially displaying the next stored statement in response to said first or second directional scroll signal indicating userinstructured movement of said cursor in said first or second direction beyond the outermost pre-programmed position of the displayed statement, said computer means incrementing up and down the value of said segment of alterable information corresponding to the pre-programmed position to which said cursor has been moved in response to said increment up and down signals.

10. A method of operating a control system by a user, the control system including a display for displaying selected statements from a plurality of computer stored statements, each said stored statement containing one or more separate segments of user-alterable information and one or more separate segments of non-alterable information wherein the non-alterable information is provided for identifying the significance of said user-alterable information, comprising:

providing on the display one or more generally linearly arranged pre-programmed positions in each displayed statement;

assigning each of said segments of alterable information at least one of said pre-programmed positions in each displayed statement;

providing a cursor on said display movable in first and second opposite directions between said one or more preprogrammed positions in each displayed statement;

moving said cursor in response to user-generated first and second directional scroll signals between said pre-programmed positions in said first or second direction;

scrolling the display in the first or second direction to sequentially display the next stored statement in response to a user-generated first or second directional scroll signal indicating user-instructed movement of said cursor in said first or second direction beyond the outermost pre-programmed position of the displayed statement; and incrementing up or down the value of said segment of alterable information corresponding to the pre-programmed position to which said cursor has been moved in response to usergenerated increment up and down signals.

* * * * *

UNITED STATES PATENT AND TRADEMARK OFFICE
CERTIFICATE OF CORRECTION

PATENT NO. : 4,786,895
DATED : November 22, 1988
INVENTOR(S) : Fernando Castaneda It is certified that error appears in the above-identified patent and that said Letters Patent is hereby corrected as shown below:

In claim 1, column 7, line 11, delete "or" and substitute therefor --of--.

In claim 2, column 8, line 3, delete "segments" and substitute therefor --segment--.

In claim 9, column 9, line 2, delete "userinstructured" and substitute therefor --user-instructed--.

In claim 10, column 10, line 22, delete "usergenerated" and substitute therefor --user-generated--.

Signed and Sealed this

Ninth Day of May, 1989

Attest:

DONALD J. QUIGG

Attesting Officer

Commissioner of Patents and Trademarks